United States Patent
Matsumoto

[11] 3,724,351
[45] Apr. 3, 1973

[54] DEVICE FOR MOUNTING ELECTROMAGNETICALLY ATTRACTABLE PIECE FOR LATCHING ELECTRONIC SHUTTER IN CAMERA

[75] Inventor: Toshiaki Matsumoto, Amagasaki, Japan

[73] Assignee: Minolta Camera Kabushiki Kaisha, Osaka, Japan

[22] Filed: Sept. 23, 1971

[21] Appl. No.: 182,972

[52] U.S. Cl. ................................95/53 E, 335/276
[51] Int. Cl. ...........................G03b 9/08, H01f 7/14
[58] Field of Search ..95/10 C, 10 CT, 53 EA, 53 EB; 335/219, 270, 273, 275, 276

[56] References Cited

UNITED STATES PATENTS

| | | |
|---|---|---|
| 3,616,731 | 11/1971 | Rentschler..................95/53 EB X |
| 3,460,451 | 8/1969 | Starp et al....................95/53 EB X |
| 3,437,026 | 4/1969 | Espig...............................95/53 EB |
| 3,504,611 | 4/1970 | Richter et al..................95/53 EA X |
| 3,498,195 | 3/1970 | Shigeo Ono....................95/10 CT |
| 3,496,852 | 2/1970 | Rittman..........................95/53 EB |

Primary Examiner—Joseph F. Peters, Jr.
Attorney—Stanley Wolder

[57] ABSTRACT

An electromagnetically attractable piece having a face to be attracted to an electromagnet is rotatably mounted on a pivot on a shutter latch member, and a restricting member for limiting the rotation of the attraction member is disposed in the rear of the attractable piece, whereby the change in position of the attractable piece with respect to the electromagnet when it is released therefrom is restricted to eliminate detrimental effects on the shutter speed.

8 Claims, 5 Drawing Figures

Inventor
TOSHIAKI MATSUMOTO
By Stanley Wolle

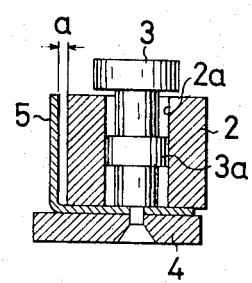
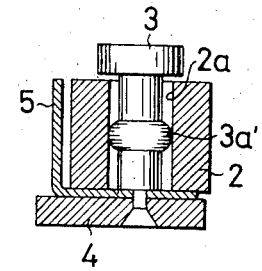
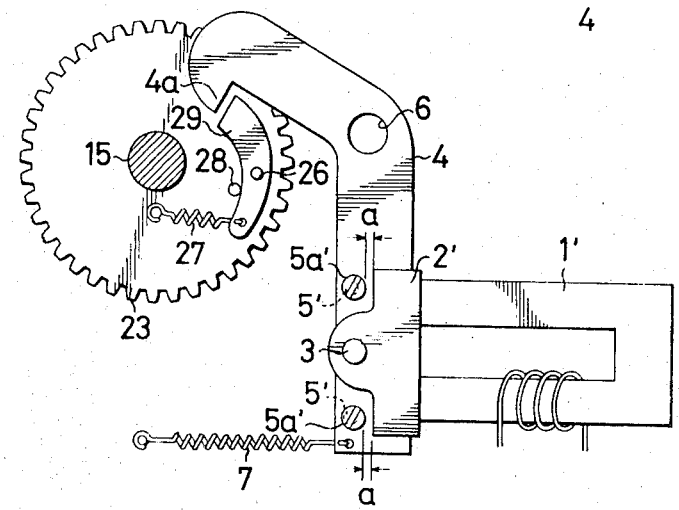

3,724,351

DEVICE FOR MOUNTING ELECTROMAGNETICALLY ATTRACTABLE PIECE FOR LATCHING ELECTRONIC SHUTTER IN CAMERA

BACKGROUND OF THE INVENTION

The present invention relates to a device for mounting an electromagnetically attractable piece for latching an electronic shutter in a camera incorporating such shutter, more particularly to improvements in a device for mounting an attraction piece on a member for latching an electronic shutter which piece has a face to be attracted to the attracting face of an electromagnet for latching the electronic shutter in its operation initiating position.

The state of an electromagnetically attractable piece attracted to an electromagnet in facing relation therewith, namely the relationship between the positions of the face of the piece to be attracted and of the attracting face of the electromagnet exerts a great influence on the electromagnetic attraction on the attracted piece. More specifically, if the current energizing the electromagnet is constant, the highest electromagnetic attraction acts on the attracted piece when the attracted face of the piece is fully in fitting contact with the attracting face of the magnet. Where one of the faces is inclined with respect to the other, the electromagnetic attraction decreases with the increase in the inclination angle.

With an electromagnetic attraction mechanism including such attraction relationship, a device has already been known which includes an attraction piece pivotably mounted on a mounting member to obtain the most effective electromagnetic attraction with a low energizing current. In the case of an electronic shutter, the mounting member corresponds to a member for latching the shutter at the shutter closing initiating position or a member for latching the shutter at the shutter opening initiating position.

However, the arrangement wherein the attraction piece is merely mounted pivotably on the latch member has the drawback that, when the attraction piece is to be released from the attracting face of the electromagnet by a spring or the like upon the de-energization of the electromagnet to free the electronic shutter from the cocked position, the attracted face of the pivotable piece becomes inclined with respect to the attracting face of the electromagnet due to the attraction by the residual magnetism. Consequently, the attracted piece is not always in a uniform position when it is released from the electromagnet, with the result that the latch member takes a varying period of time to unlatch the shutter upon the de-energization of the electromagnet to produce an unnegligible error in the exposure time of the shutter.

If the attraction piece is secured to the latch member to eliminate such drawback, it becomes very difficult to achieve full contact between the attracted piece and the electromagnet.

SUMMARY OF THE INVENTION

An object of the present invention is to provide a device for pivotably mounting an attraction piece on a latch member so that the attraction piece can be electromagnetically attracted to the attracting face of an electromagnet, the device being capable of restricting the change in position of the attraction piece as it is to be released from the attracting face of the electromagnet to thereby eliminate any detrimental effect on the shutter speed.

Another object of the present invention is to provide a device wherein the member for restricting the change in position of the attraction piece is very simple in construction and the restricting position can be adjusted with extreme ease.

Another object of this invention is to provide an improved construction for supporting the attraction piece on the latch member by which the attraction piece can be attracted to the electromagnet with a maximum electromagnetic attraction all the time.

In accordance with this invention, the device for pivotably mounting the attraction piece on the latch member includes a member for restricting the pivotal movement of the attraction piece to a certain range. The restricting member is mounted on the latch member in the rear of the attraction piece, with a clearance formed between the attraction piece and the restricting member.

Accordingly, when the attraction piece is to be released from the attracting face of the electromagnet upon de-energization thereof, the pivotal movement of the attraction piece is restricted to the range defined by the clearance even when the piece is subjected to the residual magnetism of the electromagnet, with the result that the inclination angle of the face to be attracted is limited with respect to the attracting face. In this way, the attraction piece can be released from the attracting face of the electromagnet, with the change in position of the piece limited to a constant range all the time.

The foregoing construction serves to minimize the variation in the time the latch member takes to trip the shutter upon de-energization of the electromagnet. According to the experiments by the present inventors, the above-mentioned time which was conventionally in the range of 0.2 to 0.3 millisecond has been reduced to about one-tenth of this range, namely to the range of 0.02 to 0.03 millisecond with this invention. The invention therefore eliminates any detrimental effects on the shutter speed and achieves an outstanding result in high speed shutter operation.

The amount of change in the position of the attraction piece during the above-mentioned operation may be controlled by adjusting the clearance between the rear face of the attraction piece and the restricting member without requiring special means or a troublesome procedure.

To support the attraction piece on the latch member, there is provided an upright pivot on the latch member which pivot has an annular projection positioned approximately midway of its height, and the attraction piece is formed with an opening for the projection to loosely fit in. The attraction piece, when mounted on the pivot, is therefore adapted for pivotal movement about the axis of the pivot and can also be pivoted in such direction that the axis of the opening of the attraction piece will be inclined with respect to the axis of the pivot at the center of the projection. In other words, the attraction piece can be moved pivotally in such manner that the face of the piece to be attracted will be in fitting contact with the electromagnet all the time.

BRIEF DESCRIPTION OF THE DRAWING

FIG. 3 is a view in vertical section taken along the line III — III in FIG. 2;

FIG. 4 is a plan view showing a modification of the part shown in FIG. 2; and

FIG. 5 is a view in vertical section showing a modification of the part shown in FIG. 3.

DESCRIPTION OF THE PREFERRED EMBODIMENTS

Figure 1:
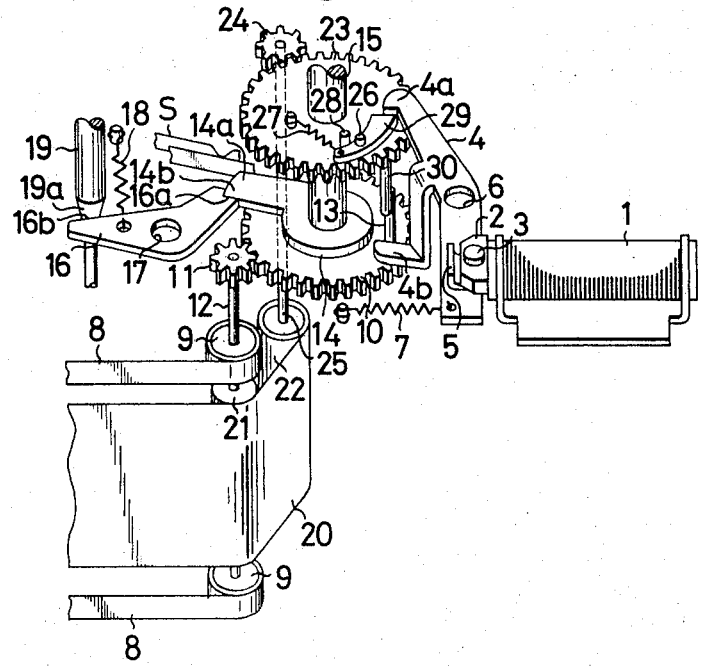
FIG. 1 is a perspective view showing the construction of principal part of an embodiment of this invention.

Referring to FIG. 1, indicated at 1 is an electromagnet fixedly mounted on a suitable portion within the camera body (not shown). An attraction piece 2 to be attracted by the electromagnet 1 is pivoted at 3 to the tail end of a latch 4. A restricting member 5 made of a plate spring or the like bent in an L-shaped form as illustrated is positioned in the rear of the attraction piece 2 and fixed to the tail end of the latch 4. The latch 4 is rotatably supported at its hole 6 on an unillustrated pivot and has a hook 4a at its distal end. The latch 4 is urged in a clockwise direction in the drawing by a spring 7 acting on the tail end.

The first curtain 8 of a focal plane shutter is wound up on a cylinder 9 which is secured to a shaft 12 fixedly carrying at its one end a pinion 11 in meshing engagement with a gear 10. The gear 10 is mounted on a shaft 15 within the camera body and is fixedly provided with a pin or a similar member 13 for winding up a second curtain 20 and a first curtain latch cam 14. The first curtain latch cam 14 has an engaging portion 14a for opening and closing a switch S corresponding to the trigger switch of unillustrated exposure control electric circuit of an electronic shutter already known. The latch cam 14 further includes an engaging portion 14b for engagement with a cutout 16a formed in a first curtain latch lever 16 which is rotatably supported, at its hole 17, on an unillustrated pivot. The latch lever 16 is urged in a clockwise direction in the drawing by a spring 18, with its driven end 16b in engagement with the tapered portion 19a of a release pin 19 which is urged upward for a return movement.

The second curtain 20 is guided along a roller 21 rotatably mounted on the shaft 12 and wound up on a cylinder 22 during a shutter cocking operation. The cylinder 22 is secured to a shaft 25 fixedly carrying at its one end a pinion 24 meshing with a gear 23. The gear 23 is mounted on the shaft 15. Pivoted at 26 on the gear 23 is an engaging member 29 which is urged in a clockwise direction by a spring 27 and whose position is determined by a stopper 28. The front end of the member 29 is engageable with the hook 4a of the latch 4. Extending from the under face of the gear 23 is a pin 30 for engagement with the second curtain winding member 13 on the gear 10.

The latch 4 is further formed with an arm 4b having a distal end in engagement with the second curtain winding member 13.

Needless to say, the first curtain 8 and the second curtain 20 are urged in the shutter releasing direction (i.e., leftward in the drawing).

The foregoing structure is shown in FIG. 1 as the shutter is in the cocked position. The depression of the release pin 19 closes the main switch of the exposure control electric circuit to energize the electromagnet 1, which therefore attracts the attraction piece 2 and holds the latch 4 in the illustrated position. Consequently, the second curtain 20 is retained at its tensioned position. When the release pin 19 is further depressed, the tapered portion 19a of the pin 19 rotates the first curtain latch lever 16 in a counterclockwise direction against the action of the spring 18 to free the engaging portion 14b of the latch cam 14 from engagement with the lever 16, whereupon the first curtain 8 which is urged in the leftward in the drawing travels to initiate an exposure, driving the gear 10 and the latch cam 14 in a counterclockwise direction through the pinion 11. Due to the rotation of the gear 10, the second curtain winding member 13 also moves in a counterclockwise direction out of contact with the arm 4b and pin 30. The latch 4 is now free to rotate in a clockwise direction. Further the initiation of counterclockwise rotation of the latch cam 4 opens the trigger switch S and initiates the exposure control circuit into exposure time controlling action. However, even when the second curtain winding member 13 is disengaged from the arm 4b of the latch 4, the latch 4 remains stationary since the electromagnet 1 continues to attract the attraction piece 2. Due to the disengagement of the second curtain winding member 13 from the pin 30, the second curtain 20 which is tensioned tends to rotate the gear 23 in a counterclockwise direction, but the engagement of the engaging member 29 on the gear 23 with the hook 4a prevents this movement, with the result that the second curtain 20 is allowed to move only an amount corresponding to the clearance between the engaging member 29 and the hook 4a and is stopped.

Upon the lapse of a predetermined time of exposure or of an exposure time corresponding to the brightness of the subject, the control circuit functions to interrupt the supply of current to the electromagnet 1 to de-energize the same, whereupon the latch 4 turns clockwise under the action of the spring 7 and unlatches the engaging member 29. As a result, the second curtain 20 is freed from its tensioned position into travel to close the shutter. Through the pinion 24, this movement causes the gear 23 to rotate in a counterclockwise direction. When relieved of the depression, the release pin 19 returns upward and opens the main switch of the control circuit.

To cock the shutter, the gear 10 is driven in a clockwise direction by a winding mechanism including clutch means already known to thereby wind up the first curtain 8 through the pinion 11, while causing the second curtain winding member 13 on the gear 10 to push the pin 30 and rotate the gear 23 in a clockwise direction. The gear 23 further causes the pinion 24 to wind up the second curtain 20.

At the final stage of the winding, the second curtain winding member 13 pushes the arm 4b of the latch 4 to rotate the latch 4 in a counterclockwise direction while tensioning the spring 7. Due to this movement, the hook 4a rotates the engaging member 29 in a counterclockwise direction. At the position where the winding is almost completed, the front end of the engaging member 29 moves past the position of the hook 4a and comes into engagement with the hook 4a under the action of the spring 27. On the other hand, at the position where the winding is almost completed, the latch cam 14 closes the trigger switch S with its engaging portion 14a and the engaging portion 14b comes into engagement with the cutout 16a of the first curtain latch lever 16 which is urged clockwise by the spring 18. Thus the winding is completed. In this state, the attraction piece 2 comes into fitting contact with the attracting face of the electromagnet 1.

Figure 2:
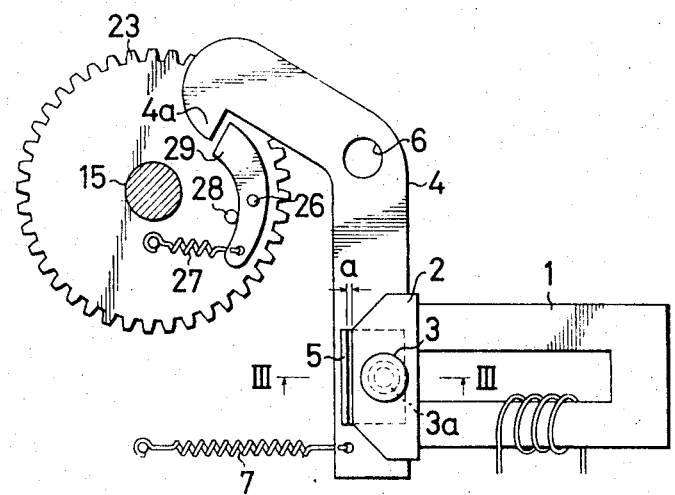
FIG. 2 is a plan view illustrating the same.

As shown in greater detail in FIGS. 2 and 3, the attraction piece 2 is formed with an opening 2a having a greater diameter than the pivot 3 which includes an annular projection 3a positioned approximately at the middle of its height and loosely fitting in the opening 2a. Thus, the attraction piece 2 can also be moved pivotally on the projection 3a in such direction that the axis of opening 2a of the attraction piece 2 will be inclined with respect to the axis of the pivot 3, so that even when the attracting face of the electromagnet 1 is inclined, the attraction piece 2 will be pivotally moved in corresponding relation with the inclination for snug-fit contact with the attracting face.

The annular projection 3a may alternatively be in the form of a projection 3a' having a spherical outer periphery as shown in FIG. 5. This enables the attraction piece 2 to pivotally move with greater smoothness.

The restricting member 5 positioned in the rear of the attraction piece 2 is spaced apart therefrom by a suitable distance a, so as to limit the amount of pivotal movement of the attraction piece 2 to a predetermined range. Accordingly, in the case where the electromagnet 1 still has residual magnetism or the attraction piece 2 is still subjected to feeble attraction due to the flow of a low current through the winding of the electromagnet 1 when the electromagnet 1 is to be released from the electromagnet 1, the pivotal movement of the attraction piece 2 prevents the attracted face thereof from being pulled to the attracting face of the electromagnet to ensure disengagement therefrom while the pivotal movement is being restricted by the restricting member 5. In this way, the range of the variation in the time required for the disengagement of the attraction piece can be reduced to one-tenth the range heretofore required.

In the illustrated embodiment including the restricting member 5 made of a plate spring, the clearance a can be readily adjusted by changing the bending angle of the plate spring.

The restricting member may alternatively comprise a pair of eccentric pins 5' provided on the latch 4 and having eccentric heads 5a' as seen in FIG. 4. The eccentric pins 5' may be positioned in the rear of an attraction piece 2' pivoted at 3 as already described. The clearance a can then be adjusted by rotating the pins 5'.

Although FIG. 1 shows an electronic shutter equipped with a focal plane shutter mechanism in combination with the latch 4 for retaining the second curtain at its tensioned position, the latch can of course be used for a lens shutter mechanism. In this case the latch serves to retain a shutter opening member or a shutter closing member at its tensioned position. The foregoing construction may further be modified to reduce the number of the constituent parts. For instance, in place of the pinion 24 which is driven when the second curtain is travelled, it is possible to employ a cam which is formed with a cutout or the like for engagement with the hook 4a of the latch 4 so as to permit the travel of the second curtain in direct operative relation with the movement of the latch. The gear 23 will then be dispensed with.

What is claimed is:

1. A device for mounting an electromagnetically attractable armature on a shutter latching member in a camera comprising,
   an upright pivot on a shutter latching member,
   an electromagnetically attractable armature pivotably mounted on said pivot and having a face to be attracted in fitting contact with the attracting face of an electromagnet when the shutter is in cocked position, and
   a restricting member movably mounted on said shutter latching member in the rear of said armature with a suitable clearance formed between said armature and said restricting member, said restricting member being adjustable to vary said clearance by the relative movement of said restraining member to limit the pivotal movement of said armature to the range defined by said clearance.

2. The device as set forth in claim 1 wherein said restricting member comprises a pair of pins rotatably mounted on said latching member and each having an eccentric head and said eccentric heads are positioned in the rear of said armature with a suitable clearance formed therebetween.

3. The device as set forth in claim 1 wherein said pivot is provided with an annular projection approximately midway of its height and said armature is formed with an opening for said projection to loosely fit in.

4. The device as set forth in claim 3 wherein the outer peripheral surface of said annular projection is in the form of a spherical surface.

5. A device for mounting an electromagnetically attractable armature on a shutter latching member in a camera comprising:
   an upright pivot on said shutter latching member;
   an electromagnetically attractable armature pivotally mounted on said pivot and having a face to be attracted in fitting contact with the attracting face of an electromagnet when the shutter is in cocked position; and
   a restricting member including an L-shaped plate spring mounted on said shutter latching member, the upright portion of said restricting member being disposed in the rear of said armature with a suitable clearance formed therebetween, which limits the pivotal movement of said armature to the range defined by said clearance.

6. The device as set forth in claim 5, wherein said pivot is provided with an annular projection approximately midway of its height and said armature is formed with an opening for said projection to loosely fit in.

7. The device as set forth in claim 6 wherein the outer peripheral surface of said annular projection is in the form of a spherical surface.

8. The device as set forth in claim 5, wherein said L-shaped spring plate is bendable about its elbow to vary said angle and adjust said clearance between said upright portion and said armature.

* * * * *